US010149573B2

(12) United States Patent
Volatier et al.

(10) Patent No.: US 10,149,573 B2
(45) Date of Patent: Dec. 11, 2018

(54) SMOKE-DIFFUSING ACCESSORY FOR ELECTRIC BARBECUE

(71) Applicant: SEB S.A., Ecully (FR)

(72) Inventors: Sébastien Volatier, Dijon (FR); François Letain, Marcilly-sur-Tille (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/538,134

(22) PCT Filed: Dec. 18, 2015

(86) PCT No.: PCT/FR2015/053641
§ 371 (c)(1),
(2) Date: Jun. 20, 2017

(87) PCT Pub. No.: WO2016/102852
PCT Pub. Date: Jun. 30, 2016

(65) Prior Publication Data
US 2017/0347834 A1 Dec. 7, 2017

(30) Foreign Application Priority Data
Dec. 23, 2014 (FR) ...................... 14 63189

(51) Int. Cl.
A47J 37/06 (2006.01)
A23B 4/052 (2006.01)
A47J 37/07 (2006.01)

(52) U.S. Cl.
CPC ........... A47J 37/0629 (2013.01); A23B 4/052 (2013.01); A47J 37/0709 (2013.01); A47J 37/0786 (2013.01); A23V 2002/00 (2013.01)

(58) Field of Classification Search
CPC .... A47J 37/0629; A47J 37/0786; A23B 4/052
USPC .......................................... 99/447, 482, 481
See application file for complete search history.

(56) References Cited

U.S. PATENT DOCUMENTS

| 5,582,094 | A | * | 12/1996 | Peterson | A47J 37/0786 |
| | | | | | 126/25 R |
| 7,832,330 | B1 | | 11/2010 | Thompson | |
| 8,042,459 | B2 | * | 10/2011 | Wu | A47J 37/0786 |
| | | | | | 126/25 R |
| 8,042,469 | B2 | | 10/2011 | Wu | |

(Continued)

OTHER PUBLICATIONS

International Search Report as issued in International Patent Application No. PCT/FR2015/053641, dated Mar. 10, 2016.

(Continued)

Primary Examiner — Dana Ross
Assistant Examiner — Kuangyue Chen
(74) Attorney, Agent, or Firm — Pillsbury Winthrrop Shaw Pittman LLP

(57) ABSTRACT

A smoke-diffusing accessory designed to function with a barbecue, the smoke-diffusing accessory forming a container that can contain smoke-generating materials, wherein the smoke-diffusing accessory includes a lid which engages with the container to form a closed enclosure, the lid including calibrated holes so as to regulate the supply of oxygen into the enclosure, and the smoke-diffusing accessory including a suspension system for vertically suspending the smoke-diffusing accessory in the barbecue such that the calibrated holes are oriented upwards.

24 Claims, 4 Drawing Sheets

(56) References Cited

U.S. PATENT DOCUMENTS

| | | | |
|---|---|---|---|
| D777,516 S * | 1/2017 | Hunsaker | D7/417 |
| 2004/0025714 A1 * | 2/2004 | Neal | A23B 4/0523 |
| | | | 99/482 |
| 2005/0089318 A1 * | 4/2005 | Lai | A47J 37/0623 |
| | | | 392/418 |
| 2006/0118101 A1 * | 6/2006 | Rhee | A47J 37/0786 |
| | | | 126/41 R |
| 2010/0071566 A1 | 3/2010 | Liu | |
| 2011/0252977 A1 * | 10/2011 | Sacherman | A47J 27/002 |
| | | | 99/401 |
| 2014/0299005 A1 * | 10/2014 | Vinett | A23B 4/052 |
| | | | 99/482 |

OTHER PUBLICATIONS

International Preliminary Report on Patentability and then Written Opinion of the International Searching Authortity as issued in International Patent Application No. PCT/FR2015/053641, dated Jun. 27, 2017.

* cited by examiner

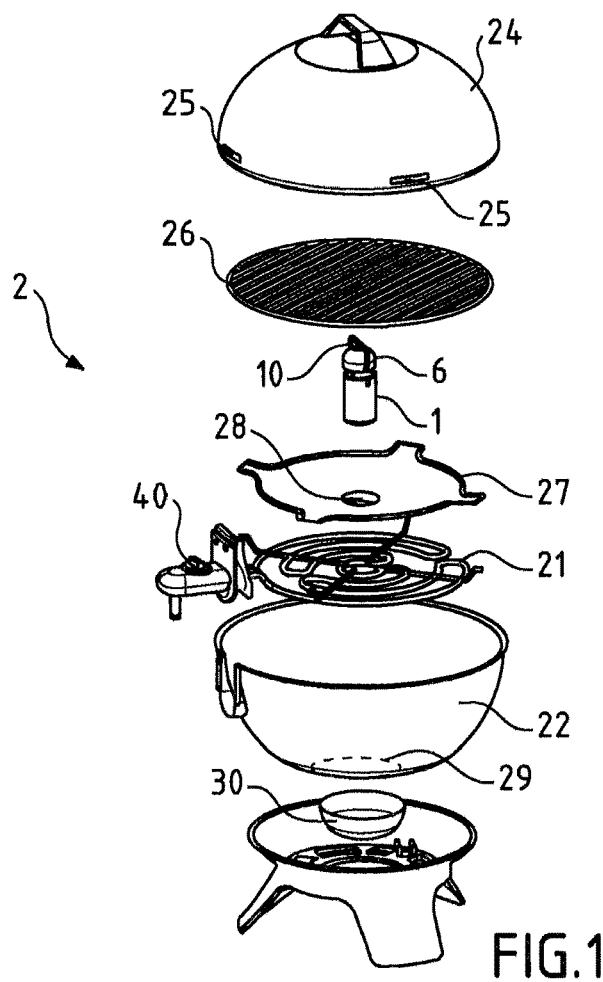
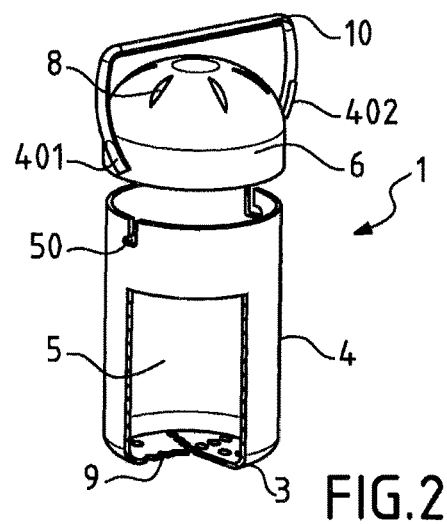

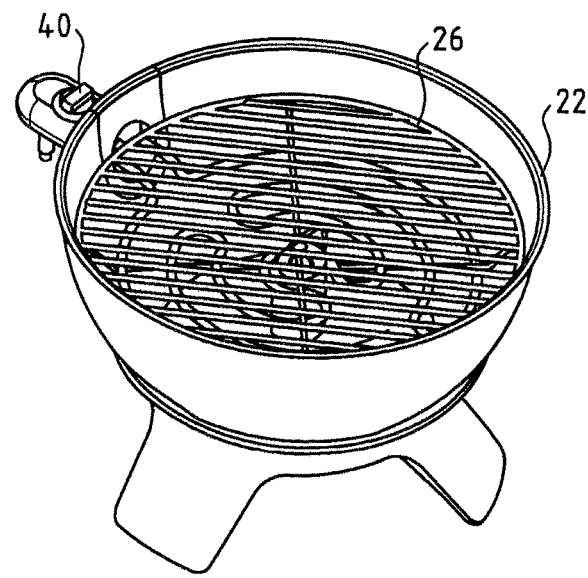
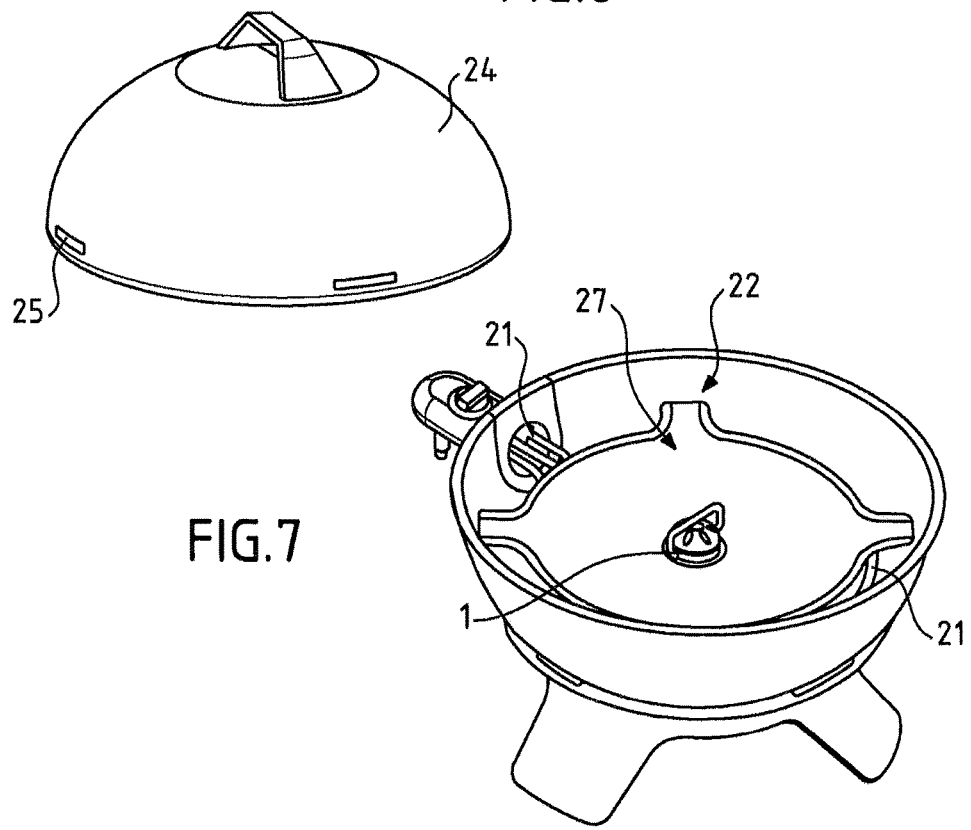
FIG.6
FIG.7

SMOKE-DIFFUSING ACCESSORY FOR ELECTRIC BARBECUE

CROSS-REFERENCE TO RELATED APPLICATIONS

This application is the U.S. National Stage of PCT/FR2015/053641, filed Dec. 18, 2015, which in turn claims priority to French patent application number 1463189 filed Dec. 23, 2014. The content of these applications are incorporated herein by reference in their entireties.

This invention concerns barbecues in general.

More specifically, the invention concerns an accessory for diffusing flavors in a barbecue.

Barbecues that include smoke-diffusing accessories are known in the prior art, such as in particular those disclosed in documents U.S. Pat. No. 8,042,459 or U.S. Pat. No. 7,832,330. In these documents, the purpose of the smoke-diffusing accessories is to produce smoke in order to flavor food. However, various disadvantages are encountered with such devices. One disadvantage encountered in the document U.S. Pat. No. 8,042,459, which describes an electric barbecue, rests in the fact that the smoke-diffusing accessory includes a large surface in contact with the electrical resistor, which could lead to ignition hazards, because the combustion of materials inside is not controlled.

In the document U.S. Pat. No. 7,832,330, the smoke-diffusing accessory is offset from the heat source, but one disadvantage encountered is that in order to offset this smoke-diffusing accessory, it is necessary to have an ancillary device which is positioned on the cooking grill, considerably reducing the grill's cooking surface.

One goal of this invention is to respond to the aforementioned disadvantages from the prior art and in particular to propose a smoke-diffusing accessory in which the combustion of materials is controlled, that is, where there is no ignition of materials, and a smoke-diffusing accessory that can be adapted to a barbecue so as to conserve maximum cooking space on a barbecue cooking grill.

To this end, a first aspect of the invention concerns a smoke-diffusing accessory adapted to work with a barbecue, this smoke-diffusing accessory forming a vessel able to contain smoke-generating materials, and characterized in that the smoke-diffusing accessory includes a lid that engages with the vessel to form a closed enclosure, the lid includes calibrated holes in order to regulate the oxygen supply in the enclosure, and the smoke-diffusing accessory includes a suspension means for vertically suspending the smoke-diffusing accessory in the barbecue so that the calibrated holes are oriented upwards.

The interest of a suspension means is to have a system that requires little space in order to position a smoke-diffusing accessory in a barbecue.

In addition, having a closed smoke-diffusing accessory facilitates the temperature increase in the enclosure and prevents grease from mixing with the combustion materials.

The calibrated holes are useful in regulating the oxygen supply in the enclosure by permitting a controlled supply of oxygen in the enclosure in order to prevent ignition.

According to a first embodiment of the suspension means, the latter is positioned on the lid.

According to one embodiment, the lid includes a handle and the suspension means includes two points of contact positioned at the base of this handle. The interest of integrating the suspension means in the handle is to have two functions in one and to reduce the production cost.

According to one embodiment, the lid includes a protection device that rises above the lid and fully covers the calibrated holes. This protection device prevents grease or splashes from penetrating the enclosure through the calibrated holes in the lid.

According to a second embodiment of the suspension means, the smoke-diffusing accessory includes a bottom wall and a side wall surrounding the bottom wall, and the suspension means is positioned on the side wall. The advantage of such an embodiment is to have a smoke-diffusing accessory that is properly suspended vertically.

According to one embodiment, the bottom wall and/or the side wall include openings adapted to regulate the oxygen supply inside the vessel. In this manner, the combustion front slowly moves from the lid toward the bottom of the smoke-diffusing accessory.

A second aspect of the invention concerns a barbecue including a bowl, an angled electrical resistor, a cooking grill positioned above the angled electrical resistor, and a smoke-diffusing accessory according to one of the aforementioned characteristics, characterized in that the smoke-diffusing accessory is suspended vertically by the suspension means below the cooking grill, at the center of the bowl, and in the middle of the angled electrical resistor, such that the latter surrounds at least in part the smoke-diffusing accessory.

The advantage contributed is to have a barbecue in which the totality of the surface of its cooking grill is dedicated to the cooking of food and a smoke-diffusing accessory which, thanks to the proximity of the angled resistor, will cause slow combustion of the materials, without risk of ignition of the latter, because of the construction of the smoke-diffusing accessory.

According to the first embodiment, the suspension means engages with the angled electrical resistor so as to suspend the smoke-diffusing accessory in the center of the bowl. The interest of having a diffusion accessory positioned vertically at the center of the bowl is that this favors the diffusion of flavors, in a uniform manner, toward the periphery of the barbecue.

According to the second embodiment, the smoke-diffusing accessory is suspended by mounting the smoke-diffusing accessory under stress against the angled electrical resistor such that the side wall and the angled electrical resistor include at least two localized attachment points.

According to one embodiment, the barbecue includes a lid adapted to fully cover the bowl and the lid includes openings positioned symmetrically in order to obtain uniform diffusion of the smoke.

The interest of having these openings positioned symmetrically is that the flavoring can be made uniform, from the center of the barbecue toward the periphery of the latter.

According to one embodiment, the barbecue includes a reflector; the reflector may be positioned in the bowl above the angled electrical resistor and below the cooking grill so as to obtain indirect cooking, or the reflector may be removed so as to obtain direct cooking of the food. The reflector thus permits having a mode of indirect cooking with the barbecue, that is, it permits protecting food against direct radiation from the electrical resistor.

According to one embodiment, the reflector is conical in shape and has an opening in its center for draining grease coming from the food placed on the cooking grill, and the opening is sized such that the smoke-diffusing accessory can pass through the opening. The interest of having this opening in the middle of the reflector is to be able to continue to drain the grease and diffuse the smoke when the barbecue is being used in the indirect cooking mode.

According to one embodiment, the bowl includes an opening in the bottom in order to drain the cooking grease from the bowl, and a grease-collecting vessel positioned facing the opening in the bottom. In this way, the grease is not wasted and can be reused or discarded.

According to one embodiment, the barbecue includes a protection device positioned on the cooking grill and above the smoke-diffusing accessory such that the grease does not flow into the diffusion accessory.

The objects, aspects and advantages of this invention will be more fully understood in consideration of the following description of a particular embodiment of the invention presented as a non-restrictive example, by referring to the attached drawings in which FIG. 1 is an exploded perspective view of the barbecue;

FIG. 2 is a view of the smoke-diffusing accessory;

FIG. 6 is a perspective view of the electric barbecue in a direct cooking mode;

FIG. 7 is a perspective view of the electric barbecue in an indirect cooking mode;

Figure 3:
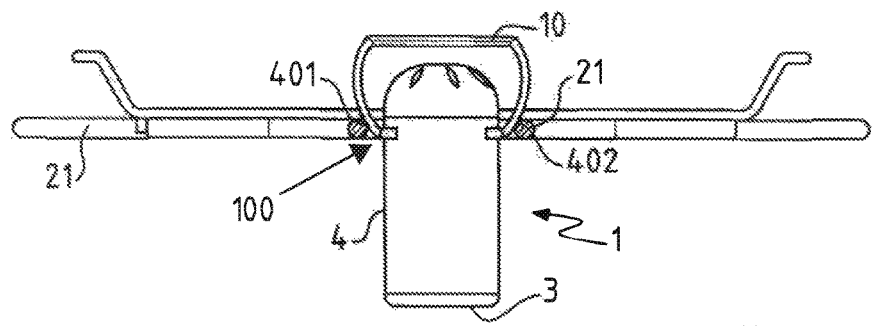
FIG. 3 is a cross-section view of the smoke-diffusing accessory according to the first embodiment.

As is visible in FIG. 1, a barbecue 2 includes a bowl 22, an angled electrical resistor 21, a cooking grill 26 and a smoke-diffusing accessory 1. The cooking grill 26 is positioned in the bowl 22 or above the bowl 22 and above the angled electrical resistor 21. The bowl 22 is in the shape of a half-sphere and has interior supports on which the cooking grill 26 is supported. In this manner, the cooking grill 26 and the electrical resistor 21 are spaced 10 mm apart.

The angled electrical resistor 21 may be circular or straight and contain one or more angles so as to have one or more strands.

The smoke-diffusing accessory 1 is positioned under the cooking grill 26.

The barbecue 2 includes a lid 24 and this lid 24 is adapted to fully cover the bowl 22. The lid 24 includes openings 25 and these openings are positioned in the periphery of the lid 24. These openings 25 are positioned every 90°, in a symmetrical manner, in order to obtain uniform diffusion of the smoke.

The barbecue 2 includes a reflector 27 visible in FIG. 1.

This reflector 27 has two different positions in the bowl 22.

In a position visible in FIG. 6, the reflector 27 is removed so as to obtain direct cooking of the food via direct radiation.

As is now visible in FIG. 7, the reflector 27 may be positioned in the bowl 22 above the angled electrical resistor 21 and below the cooking grill 26. In this way, indirect cooking of the food is obtained, because the angled electrical resistor 21 does not radiate directly onto the food, and the reflector 27 protects the food against direct radiation from the resistor.

In this configuration, the outer strands of the angled electrical resistor 21 are evident in order to accentuate the heating of the lid 24.

In the example in FIG. 7, the cooking grill 26 is placed on the reflector 27, which is used to elevate the latter and the reflector 27 includes an elevating peripheral edge which is placed on the interior supports of the bowl 22. Thus the cooking grill 26 is now 25 mm away from the angled electrical resistor 21 in this configuration. This elevating peripheral edge permits distancing the cooking grill 26 from the angled electrical resistor 21 and having a conical reflector 27 which permits draining grease and which can be positioned between the cooking grill 26 and the angled electrical resistor 21.

In order to be able to use the smoke-diffusing accessory 1, the reflector 27 includes an opening 28 in its center. In this manner, the reflector 27 permits draining the grease coming from foods placed on the cooking grill 26, and the opening 28 is sized such that the smoke-diffusing accessory 1 can pass completely through the opening 28.

According to the invention, the reflector 27 is in a conical shape in order to channel the cooking grease toward the opening 28 with a minimum slope of 7° to drain the grease, by heating, toward the center of the bowl 22.

In addition, the reflector 27 may contain peripheral openings to allow heat to reach the lid 24.

In order to collect this grease, the bowl 22 includes an opening 29 at the bottom of the latter and a grease-collecting vessel 30. The latter is positioned facing the opening 29 of the bowl 22 so as to collect the cooking grease.

As is visible in FIG. 2, the smoke-diffusing accessory 1 includes a bottom wall 3 and a side wall 4 surrounding the bottom wall 3 so as to form a vessel able to contain the smoke-generating materials. These materials may be wood chips or spices. The acceptable weight of materials in the vessel 5 is from 50 g to 100 g.

The bottom wall 3 and/or the side wall 4 include openings 9 that are calibrated in order to regulate the oxygen supply inside the vessel 5.

The smoke-diffusing accessory 1 also includes a lid 6 adapted to engage with the side wall 4 so as to close the vessel 5 and form a closed enclosure. The diffusion accessory 1 then forms a cylinder. In other variants, it may form a square, or a rectangle.

The system of closing the lid 6 may be a closure system using bayonets 50.

The lid 6 includes calibrated holes 8, and these calibrated holes 8 permit regulating the oxygen supply in the vessel 5.

The lid 6 includes a protection device 302 which rises above the lid 6. This protection device extends from the lid 6 and forms a protection above the calibrated holes 8 so that grease or waste cannot enter the enclosure through the calibrated holes 8. It fully covers the calibrated holes 8 of the lid 6. The latter may be in an umbrella shape.

As an addition or a variant, the barbecue 2 includes a protection device (not pictured) positioned on the cooking grill 26 and above the diffusion accessory 1. The latter covers the calibrated holes 8 of the lid 6 such that the grease does not flow into the diffusion accessory 1. The latter may be a metal washer or a metal disc.

The lid 6 also includes a handle 10 which extends above the lid 6. This handle 10 is used for manipulating the smoke-diffusing accessory.

In order to generate smoke to flavor the food, the smoke-diffusing accessory 1 is suspended by a suspension means 100 or system in the barbecue 2 as close as possible to the angled electrical resistor 21 but with the least possible contact in order to avoid any ignition hazard.

Suspension means 100 refers to a principal or secondary means that is adapted to vertically suspend the smoke-diffusing accessory 1 in the barbecue so that the upper part of the side wall 4 is face to face with one or more strands of the electrical resistor 21.

According to the first embodiment of the suspension means 100 visible in FIG. 3, the suspension means 100 consists in part of the handle 10 and more specifically of two contact points 401, 402 positioned at the base of this handle 10. The suspension means 100 engages in a localized manner with the angled electrical resistor 21 so as to retain and vertically suspend the smoke-diffusing accessory in the bowl 22. The dimensions of the handle 10 are thus designed to have two contact points 401, 402 which support the angled electrical resistor 21. In this manner, the side wall 4 of the smoke-diffusing accessory 1 does not include a contact point with the angled electrical resistor 21 but is face to face with the angled electrical resistor 21.

At the level of the localized contact points 401, 402, there can be a recess at the level of the handle 10 in order to increase the contact surface between the handle 10 and the angled electrical resistor 21, which permits facilitating the vertical positioning of the smoke-diffusing accessory 1.

Figure 4:
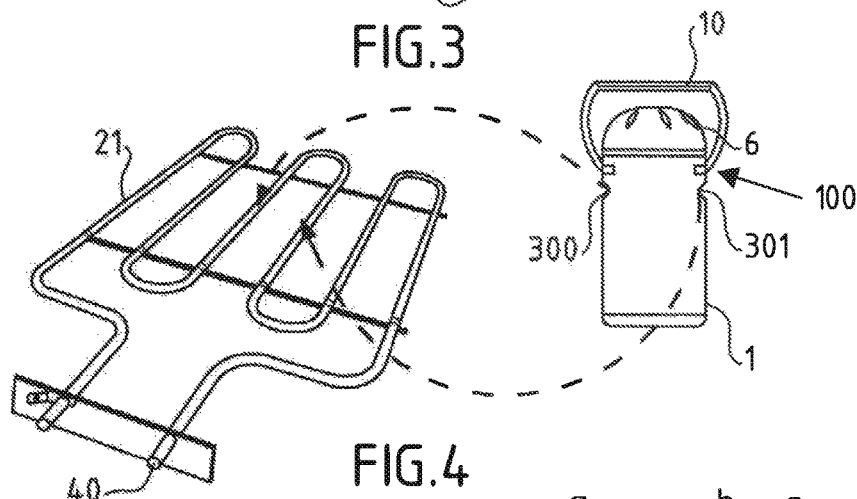
FIG. 4 is a view of the smoke-diffusing accessory according to the second embodiment.

According to the second embodiment of the suspension means 100 visible in FIG. 4, the smoke-diffusing accessory 1 is suspended by mounting under stress of the smoke-diffusing accessory 1 in the angled electrical resistor 21. More specifically, the mounting under stress takes place between two strands of the angled electrical resistor 21 such that the side wall 4 and the angled electrical resistor 21 include at least two localized attachment points 300, 301, which are part of the suspension means 100.

These localized attachment points 300, 301 may include recesses which facilitate the placement of the smoke-diffusing accessory 1 between the strands of the angled electrical resistor 21.

In either case, the smoke-diffusing accessory 1 is suspended by the suspension means 100 below the cooking grill 26 and in the middle of the angled electrical resistor 21, such that the latter surrounds at least in part the side wall 4 of the smoke-diffusing accessory 1 without causing sufficient heating to ignite the materials in the enclosure.

In one mode of functioning of the barbecue 2, it is first necessary to fill the smoke-diffusing accessory 1 with flavoring materials such as dry wood chips or spices. The user then closes the lid 6 of the smoke-diffusing accessory 1 using the bayonet closure system 50 in order to form the enclosure and then, via the suspension system 100, positions the smoke-diffusing accessory 1 vertically at the center of the bowl 22 of the barbecue 2 and in the middle of the angled electrical resistor 21.

In this manner, the proximity of the smoke-diffusing accessory 1 to the angled electrical resistor 21 will cause a stage of slow combustion (without ignition) of the wood chips or spices.

The vessel 5 of the smoke-diffusing accessory 1 being positioned perpendicularly to the plane of the angled electrical resistor 21, combustion can be slowed. In this specific case, the combustion front slowly moves from the lid 6 (at the resistor) toward the bottom wall 3 of the smoke-diffusing accessory 1. The length of the body of the accessory 1, containing the chips, determines the duration of release of smoke.

In a following step, the lid 24 of the barbecue 2 is closed, and thanks to the lid 24 of the barbecue 2, the flavoring step may begin. This will be slow, gradual, with proper control of moisture; this is called hot smoking, contrary to the methods used to conserve food by cold smoking.

The next step is a preheating step that must last about 15 minutes until the appearance of the first smoke, then the food may be placed on the cooking grill 26 in a later step. With such a construction, the flavoring step may begin and will take between 20 and 40 minutes.

Figure 5:
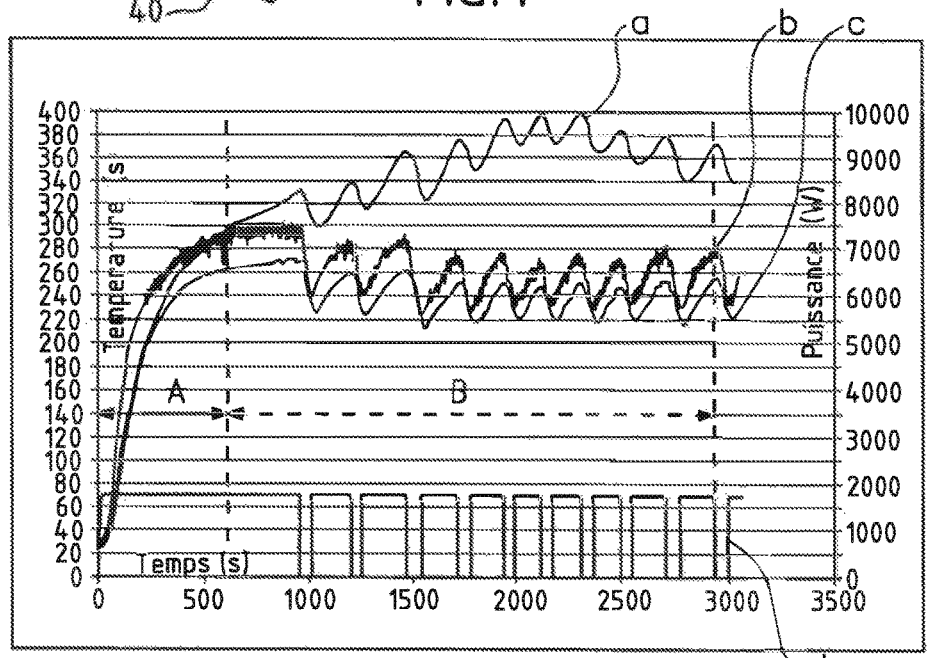
FIG. 5 is a graph of the temperature kinetics in the smoke-diffusing accessory.
Figure 8:
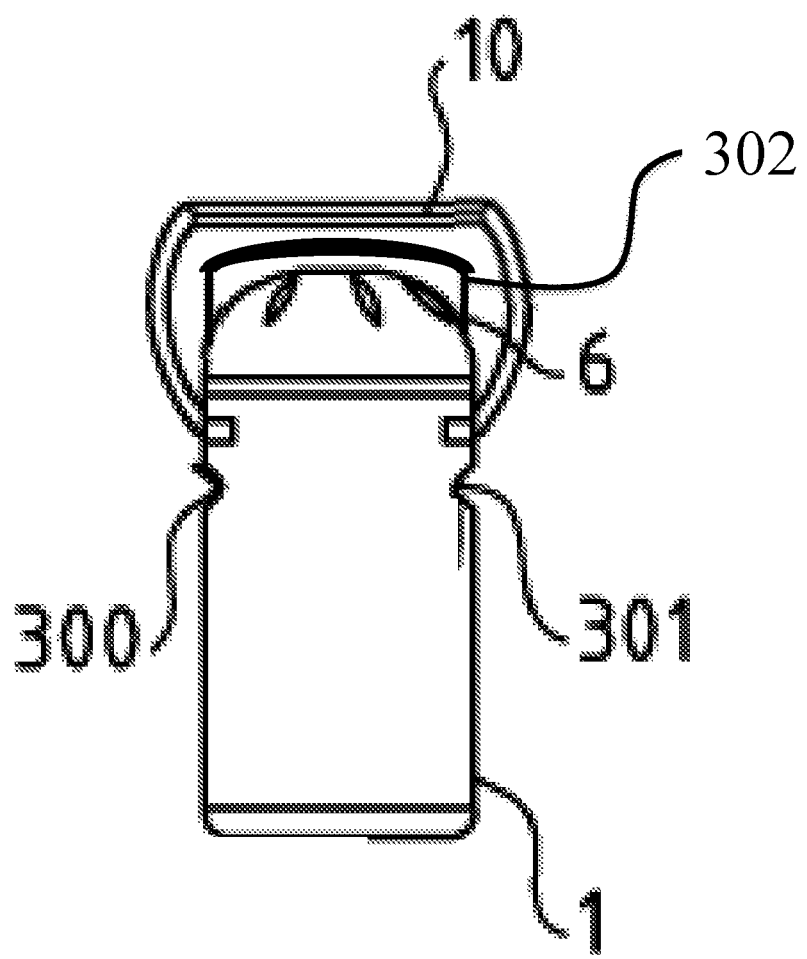
FIG. 8 is a view of the smoke-diffusing accessory according to an embodiment with a protection device that rises above the lid.

FIG. 5 describes in detail the temperature kinetics in connection with the flavoring inside the smoke diffusing accessory 1 and in which step A corresponds to the preheating step and step B corresponds to the smoke-production step.

As the smoke may be more or less strong and contribute more or less flavor, it is necessary to control the temperature kinetics.

Starting at 170° C., wood begins to char and the first wisps of true smoke appear, indicating the start of pyrolysis. At these low temperatures, the smoke resulting from the combustion has a pungent odor and a taste that is not really of interest because of the release of acid. It is starting at 200° C. that the production of acid diminishes, giving way to aromatic molecules. The effect of pyrolysis reaches its peak at around 400° C., the ideal smoking temperature. Beyond 400° C., the risks of flashover are increasingly great, with a fairly rapid rise in temperature and a degradation in the subtle composition of the smoke.

Without sparks to set off ignition, it is possible to prolong flameless combustion up to 500° C. The trick is to regulate the quantity of air inside the smoke-diffusing accessory 1: the more we limit the oxygen supply to the burning wood, the less likely the vapors are to burn, hence the interest of having an oxygen supply calibrated to the dimensions of the smoke-diffusing accessory 1.

Thus, in FIG. 5, we have the temperature of the smoke-diffusing accessory 1 which is represented by the upper curve a). The curve located above, curve b), represents the ambient temperature of the barbecue. The curve in the middle, curve c), represents the temperature of a regulator 40, and curve d) represents the power of the barbecue 2.

The temperature inside the smoke-diffusing accessory 1 is therefore lower than 450° C., in order to avoid the problems of ignition and hence the production of carcinogenic compounds on the food.

To optimize the flavors of the smoke, the temperature inside the smoke-diffusing accessory 1 is regulated at between 250 and 400° C. via the regulator 40.

The time of step B corresponding to the release of smoke is between 20 and 40 minutes.

It will be understood that various modifications and/or improvements obvious to the person skilled in the art may be made to the embodiment of the invention described in this description without departing from the context of the invention defined by the attached claims.

The invention claimed is:

1. A smoke-diffusing accessory adapted to work with a barbecue having an electrical resistor, the smoke-diffusing accessory forming a vessel that is adapted to contain smoke-generating materials, the smoke-diffusing accessory comprising a lid that engages with the vessel to form a closed enclosure, the lid including calibrated holes in order to regulate oxygen supply in the enclosure, and the smoke-diffusing accessory comprising a suspension system including two attachment points that cooperate with the electrical resistor to vertically suspend the vessel of the smoke-diffusing accessory in the barbecue so that the calibrated holes are oriented upwards.

2. The smoke-diffusing accessory according to claim 1, wherein the suspension system is positioned on the lid.

3. The smoke-diffusing accessory according to claim 2, wherein the lid includes a handle and the attachment points of the suspension system are formed by two contact points positioned at a base of the handle for contacting the electrical resistor of the barbecue.

4. The smoke-diffusing accessory according to claim 3, wherein the contact points are provided in the form of recesses.

5. The smoke-diffusing accessory according to claim 1, wherein the lid includes a protection device which rises above the lid and which fully covers the calibrated holes so as to prevent grease from penetrating the diffusion accessory.

6. The smoke-diffusing accessory according to claim 1, further comprising a bottom wall and a side wall surrounding the bottom wall, and the suspension system is positioned on the side wall.

7. The smoke-diffusing accessory according to claim 6, wherein the bottom wall, or the side wall, or both the bottom wall and the side wall, include openings adapted to regulate the oxygen supply inside the vessel.

8. The smoke-diffusing accessory according to claim 6, wherein the two attachment points are provided in the form of recesses in the side wall.

9. The smoke-diffusing accessory according to claim 1, wherein the suspension system is configured to vertically suspend the vessel and the lid of the smoke-diffusing accessory below a cooking grill of the barbecue.

10. The smoke-diffusing accessory according to claim 1, wherein the suspension system is configured to vertically suspend the smoke-diffusing accessory such that the vessel is positioned below the electrical resistor of the barbecue.

11. The smoke-diffusing accessory according to claim 10, wherein the suspension system is configured to vertically suspend the smoke-diffusing accessory such that the lid is positioned above the electrical resistor of the barbecue.

12. A barbecue including a bowl, an angled electrical resistor, a cooking grill positioned above the angled electrical resistor and a smoke-diffusing accessory, the smoke-diffusing accessory comprising: a vessel that is adapted to contain smoke-generating materials therein and a lid that engages with the vessel to form a closed enclosure, the lid including calibrated holes in order to regulate oxygen supply in the enclosure, and the smoke-diffusing accessory further comprising a suspension system including two attachment points that cooperate with the angled electrical resistor, wherein the vessel of the smoke-diffusing accessory is suspended vertically by the two attachment points of the suspension system engaging with the angled electrical resistor so as to retain and suspend the smoke-diffusing accessory in a center of the bowl and such that the vessel is positioned below the cooking grill and in a middle of the angled electrical resistor, such that the calibrated holes of the lid are oriented upwards, and such that the angled electrical resistor surrounds at least in part a portion of the vessel of the smoke-diffusing accessory.

13. The barbecue according to claim 12, wherein the two attachment points of the suspension system engage with the angled electrical resistor so as to position the lid of the smoke-diffusing accessory above the electrical resistor of the barbecue in the center of the bowl.

14. The barbecue according to claim 12, wherein the smoke-diffusing accessory is suspended by mounting the smoke-diffusing accessory under stress against the angled electrical resistor such that a side wall of the smoke-diffusing accessory includes at least the two attachment points.

15. The barbecue according to claim 12, further comprising a lid adapted to fully cover the bowl and wherein the lid of the barbecue includes openings positioned symmetrically in order to obtain uniform diffusion of smoke generated from the smoke-generating materials contained in the smoke-diffusing accessory.

16. The barbecue according to claim 12, further comprising a reflector; the reflector being positionable in the bowl above the angled electrical resistor and below the cooking grill so as to obtain indirect cooking, or the reflector being removable so as to obtain direct cooking of the food.

17. The barbecue according to claim 16, wherein the reflector is conical in shape and has an opening in its center for draining grease coming from food placed on the cooking grill, and the opening is sized such that the smoke-diffusing accessory can pass through the opening.

18. The barbecue according to claim 12, wherein the bowl includes an opening in a bottom of the bowl in order to drain the cooking grease from the bowl and a grease-collecting vessel positioned facing the opening in the bottom.

19. The barbecue according to claim 12, further comprising a protection device positioned on the cooking grill and above the smoke-diffusing accessory such that the grease does not flow into the diffusion accessory.

20. A barbecue comprising:
a bowl;
an electrical resistor;
a cooking grill positioned above the electrical resistor, and
a smoke-diffusing accessory, the smoke-diffusing accessory forming a vessel that is adapted to contain smoke-generating materials, the smoke-diffusing accessory comprising a lid that engages with the vessel to form a closed enclosure, the lid including calibrated holes in order to regulate oxygen supply in the enclosure, and the smoke-diffusing accessory comprising a suspension system that includes two attachment points that engage the electrical resistor such that the electrical resistor retains the vessel and is configured to vertically suspend the vessel of the smoke-diffusing accessory in the barbecue so that the calibrated holes are oriented upwards,
wherein the vessel of the smoke-diffusing accessory is suspended vertically by the suspension system and retained by the electrical resistor such that the vessel is positioned below the cooking grill, and such that the electrical resistor surrounds at least in part a portion of the vessel of the smoke-diffusing accessory.

21. The barbecue according to claim 20, wherein the suspension system is configured to vertically suspend the smoke-diffusing accessory such that the vessel is positioned below the electrical resistor of the barbecue and such that the lid is positioned above the electrical resistor of the barbecue.

22. The barbecue according to claim 20, wherein the lid includes a handle and the two attachment points are formed by contact points that are positioned at a base of the handle for contacting and engaging the electrical resistor of the barbecue.

23. The barbecue according to claim 20, wherein the vessel is formed by a bottom wall and a side wall, and wherein the suspension system is positioned on the side wall.

24. The barbecue according to claim 23, wherein the two attachment points are provided in the form of recesses in the side wall.

* * * * *